(12) United States Patent
Chevillard

(10) Patent No.: US 6,705,626 B2
(45) Date of Patent: Mar. 16, 2004

(54) PROCESS FOR THE ASSEMBLY OF A SUSPENSION SYSTEM

(75) Inventor: Pierre-Yves Chevillard, Albertville (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/260,853

(22) Filed: Sep. 30, 2002

(65) Prior Publication Data

US 2003/0090079 A1 May 15, 2003

Related U.S. Application Data

(63) Continuation of application No. PCT/EP01/03284, filed on Mar. 22, 2001.

(30) Foreign Application Priority Data

Mar. 31, 2000 (FR) .............................................. 00 04530

(51) Int. Cl.$^7$ ................................................. B62D 17/00
(52) U.S. Cl. .............................. 280/86.75; 280/86.751; 280/86.753
(58) Field of Search ....................... 280/86.75, 124.125, 280/86.753, 86.751

(56) References Cited

U.S. PATENT DOCUMENTS

| 4,195,862 | A | * | 4/1980 | Specktor et al. ....... 280/86.753 |
| 4,872,699 | A | | 10/1989 | Grove et al. ................. 280/661 |
| 5,110,151 | A | | 5/1992 | Blechschmidt et al. ..... 280/661 |
| 5,383,678 | A | | 1/1995 | Sokol .......................... 280/661 |
| 5,598,357 | A | | 1/1997 | Colarelli, III et al. ...... 364/559 |
| 5,622,378 | A | * | 4/1997 | Schlosser et al. ...... 280/86.753 |
| 5,918,707 | A | | 7/1999 | Saunders, III ............ 188/18 A |
| 6,036,205 | A | * | 3/2000 | Schlosser et al. ...... 280/86.753 |
| 6,485,038 | B1 | * | 11/2002 | Garrard .................... 280/86.75 |

FOREIGN PATENT DOCUMENTS

| EP | 0470527 | 2/1992 |
| WO | 9816418 | 4/1998 |

\* cited by examiner

*Primary Examiner*—Paul N. Dickson
*Assistant Examiner*—Deanna Draper
(74) *Attorney, Agent, or Firm*—Baker Botts L.L.P.

(57) ABSTRACT

The process of the invention consists in assembling a correction stub axle 2 comprising a correction angle γc on the receiving surface 3 of a suspension system 1. The stub axle is positioned along a correction azimuth δc as a function of an error azimuth δd of the orientation of the receiving surface 3 relative to the nominal orientation intended.

6 Claims, 5 Drawing Sheets

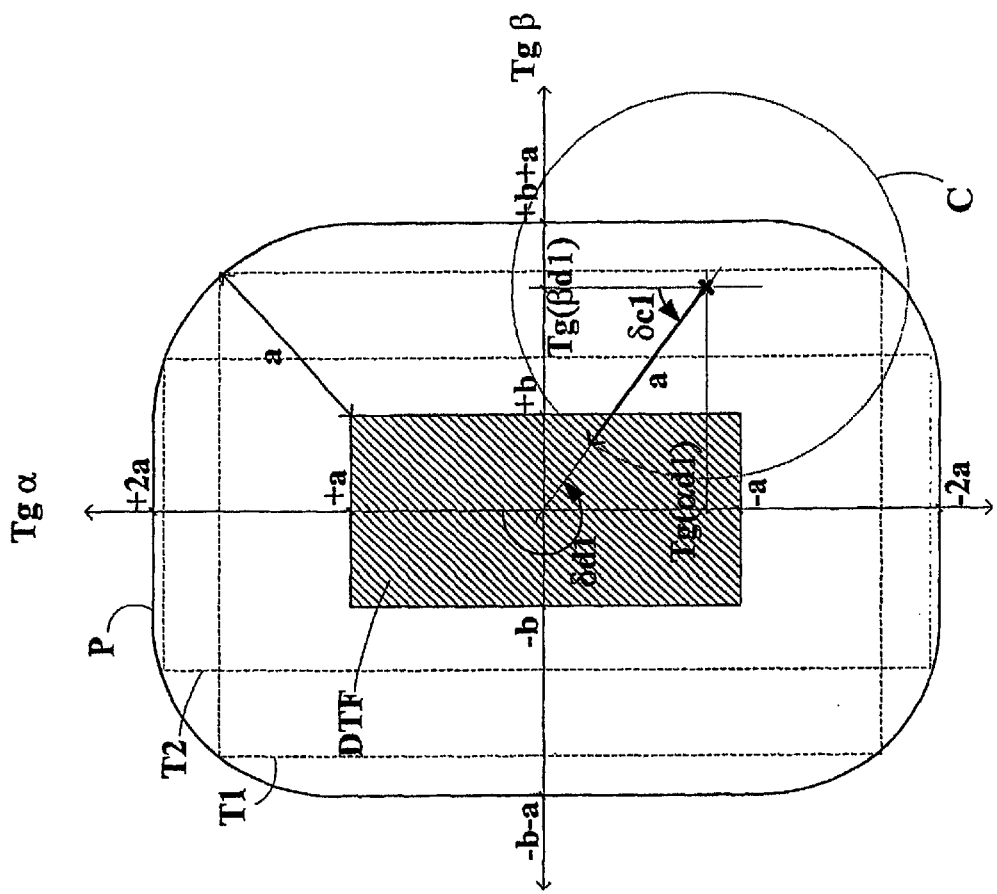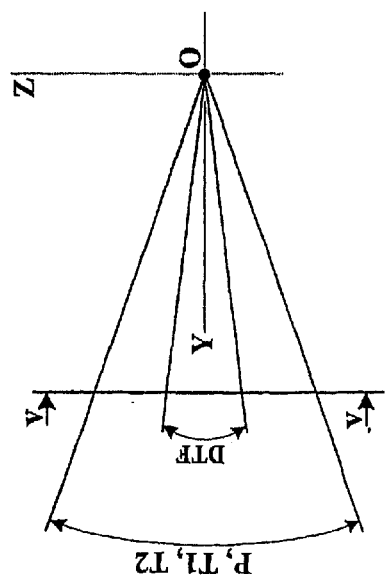

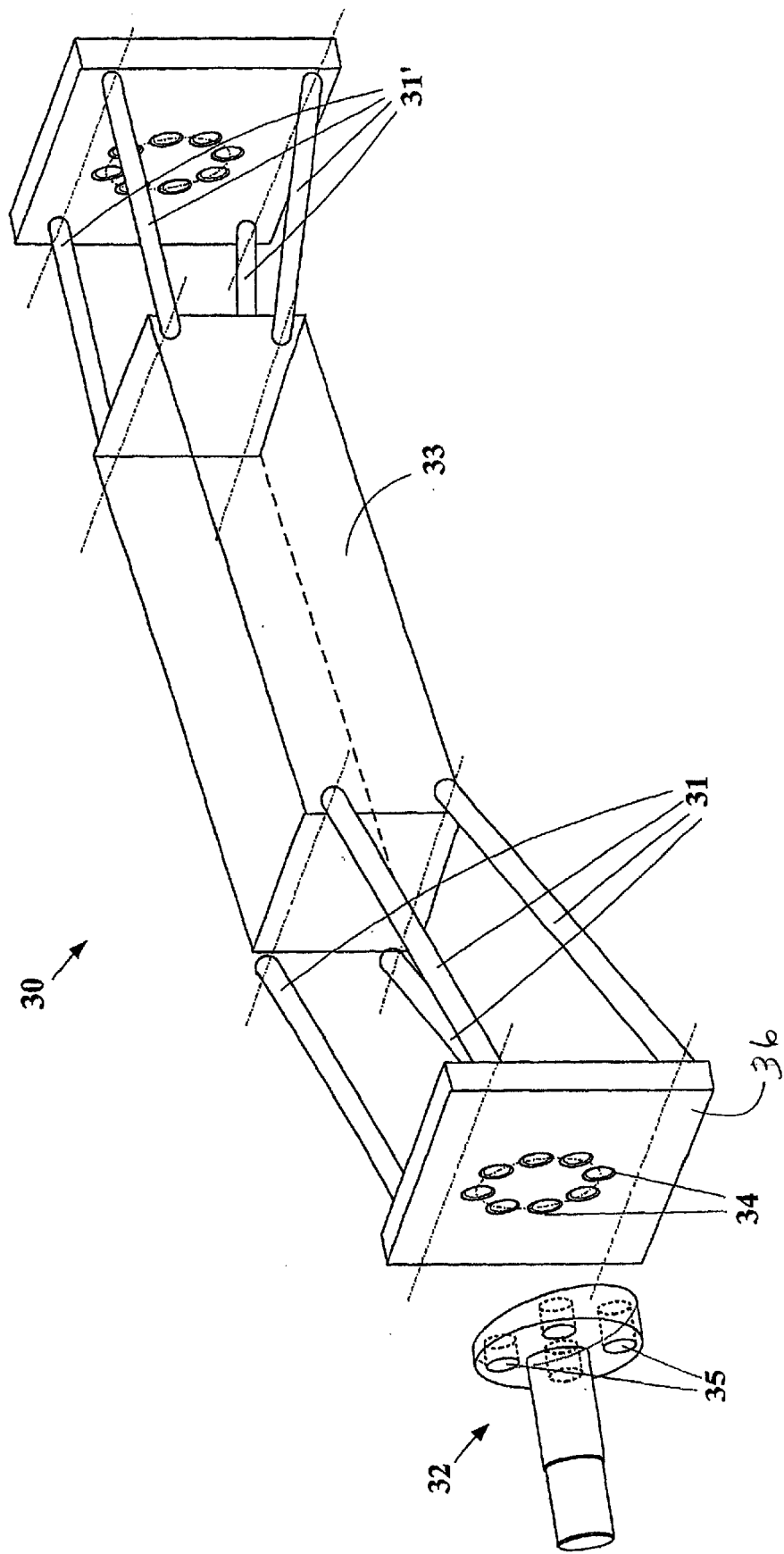

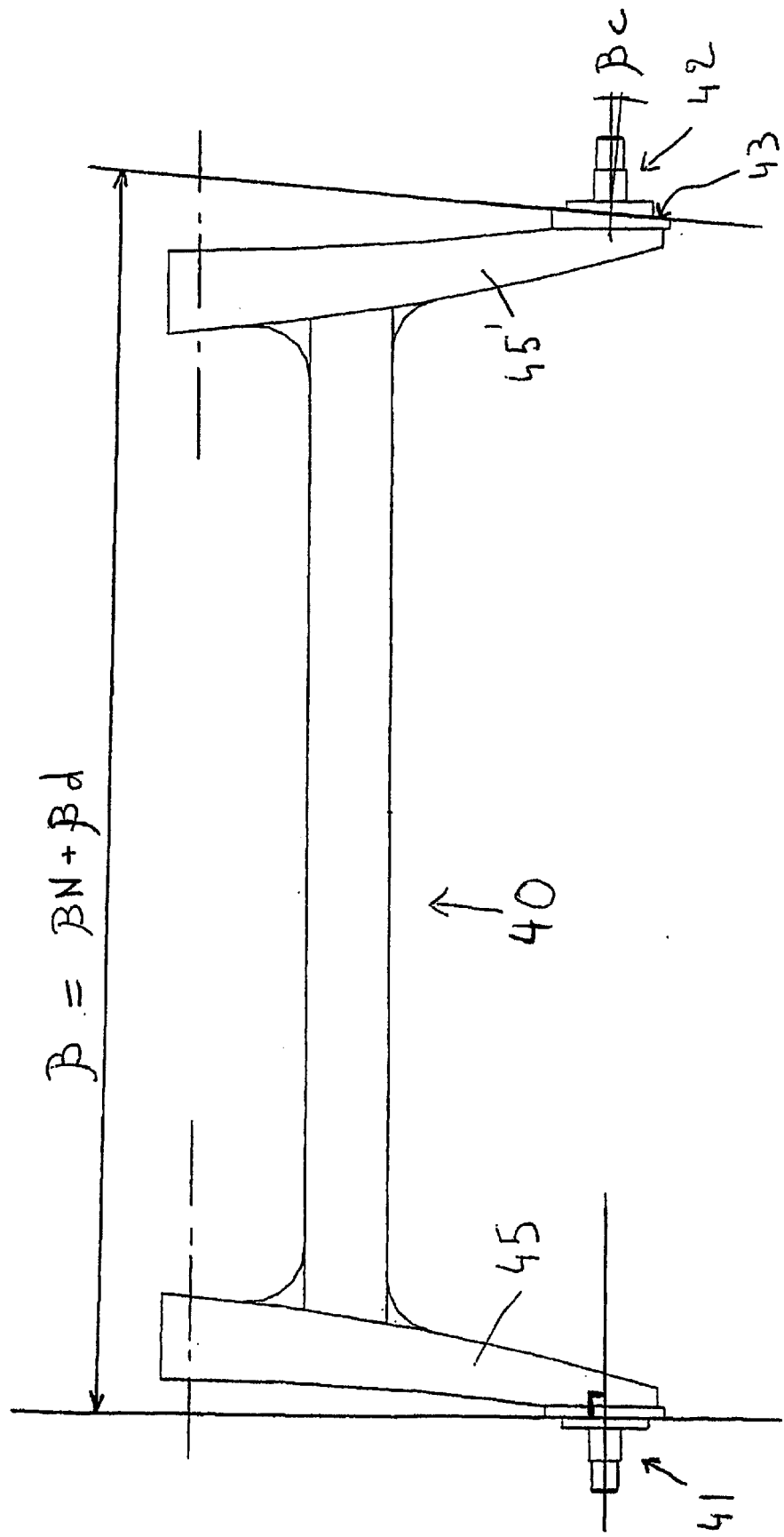

PROCESS FOR THE ASSEMBLY OF A SUSPENSION SYSTEM

CROSS REFERENCE TO RELATED APPLICATIONS

This is a continuation of international application PCT/EP01/03284 filed Mar. 22, 2001, which was published in French on Oct. 11, 2001 as international publication WO 01/74647 and which claims priority of French application 00/04530 filed Mar. 31, 2000.

BACKGROUND OF THE INVENTION

1. The Field of the Invention

The present invention relates to methods for the assembly of mechanical systems, in particular suspension devices intended for fitting on vehicles, and the scatter with respect to nominal orientation obtained during the manufacture thereof.

2. The Related Art

In an automotive vehicle, the wheels are held in position relative to the body by the suspension system. More precisely, the wheels are mounted on hubs which rotate, via a bearing or group of bearings, relative to a stub axle or wheel support connected to the suspension elements, which are themselves connected to the body. The precise orientation of the wheel axis (determined by the bearings) is an important element for the handling of the vehicle during use. For that reason automobile manufacturers strive for close tolerances as regards the final orientation of the wheel axis, such orientation being the result of assembling together numerous mechanical components connected to one another by articulations or rigid joints. A consequence of the principle of nominal value chains is that, to achieve a final nominal value (in this case a final angle of orientation) within a certain tolerance, the manufacturing tolerance of each element in the assembly must be a fraction of the final tolerance. Even disregarding the variability of the position of the attachment points to the body and considering only the suspension sub-assembly, it is still a real problem for manufacturers to obtain overall nominal values within the tolerances demanded.

Various solutions are known for this problem, which are implemented according to the type of systems concerned and the precision sought. For example, in the case of a "multi-arm" axle (so termed, because it consists of several arms which control the movements of the wheel support), the precision desired can be obtained by adjusting the system on a measurement bench after assembly. This adjustment is carried out by adapting the length of certain elements with the aid, for example, of a male and female screw joint or by the displacement of attachment points, for example by means of oblong holes. Solutions of this type necessitate a system designed to be adjustable (and therefore one that is heavier and/or more expensive), and a complex and costly adjustment step in the manufacturing process. Moreover, this adjustment is often lost during subsequent repairs of the vehicle, and the adjustment process must therefore be repeated. Another solution, one which is often used in the case of welded axles (such as rear torsion axles), is to machine certain reference surfaces after assembly of the elements, for example the plates on which the stub axles are fixed. This machining stage is also costly and necessitates the presence of a reserve of material designed to allow machining without compromising the strength of the system.

SUMMARY OF THE INVENTION

The object of the present invention is to reduce the statistical scatter of the final orientation of the wheel axis, while avoiding any final machining or introduction of supplementary adjustable elements.

The stub axle is generally fixed with bolts or by welding to a plate or in a bore. In general, in order to control the scatter of the final orientation of the stub axle, one checks the orientation of the plane of the plate, or that of the axis of the bore. This is for at least two reasons: on the one hand, the scatter introduced by the stub axle assembly is negligible because good precision can easily be obtained by turning, and on the other hand, the stub axle is not always part of the pre-assembled sub-group.

A principle of the invention is to use the stub axle mounting stage to reduce the final statistical scatter, by compensating at least in part the dimensional scatter of the other elements constituting the system. To do this, a stub axle is used whose axis forms a known correction angle with the axis of its surface designed to be supported on the plate (or in the bore), and the stub axle is fixed along an azimuth as a function of the angular deviation of the plate (or bore). In this way, the final scatter of the orientation of the axis of the stub axle can be statistically reduced.

Accordingly, the object of the invention is achieved by a process for the assembly of a stub axle on a suspension device intended for fitting to a vehicle, which suspension device comprises a surface that receives the stub axle. The stub axle comprises a stub axle axis and a contact surface with the suspension device, a characteristic axis of the contact surface forming a given correction angle $\gamma c$ with the stub axle axis. The process comprises the following steps:

determining the azimuth $\delta d$ of an error in the orientation of an axis characteristic of the receiving surface; and positioning the stub axle on the suspension device along an azimuth $\delta c$ essentially equal to $\delta d + \pi$.

Preferred embodiments of the invention will be described to illustrate its principles, but the invention can be implemented in many other possible ways.

BRIEF DESCRIPTION OF THE DRAWINGS

FIGS. 2a and 2b are graphical representations of the correction principle of the invention;

FIG. 3 schematically illustrates the principle of the application of the process of the invention to a so-termed "multi-arm" suspension system;

FIG. 4 schematically illustrates the principle of the application of the process of the invention to a torsion axle.

DESCRIPTION OF EXEMPLARY EMBODIMENTS

The angles shown in the figures are greatly exaggerated for the sake of clarity. In reality, these angles are generally appreciably smaller than 1 degree. It is also this order of magnitude, which justifies certain simplifications, such as that of considering the tangent of the sum of two angles to be essentially equal to the sum of their two tangents. Also, the value of the tangent of a small angle is approximately the same as the value of the angle in radian units. Further, it will be understood that the values of the angles shown in the figures are to be computed in consistent units, but that for convenience these values may be referred to herein as being in either degree or radian units.

"Azimuth" means the angle of the projection of an axis on a plane along a direction normal to that plane. "Azimuthing" is the positioning of one element relative to another along a given azimuth.

Figure 1B:
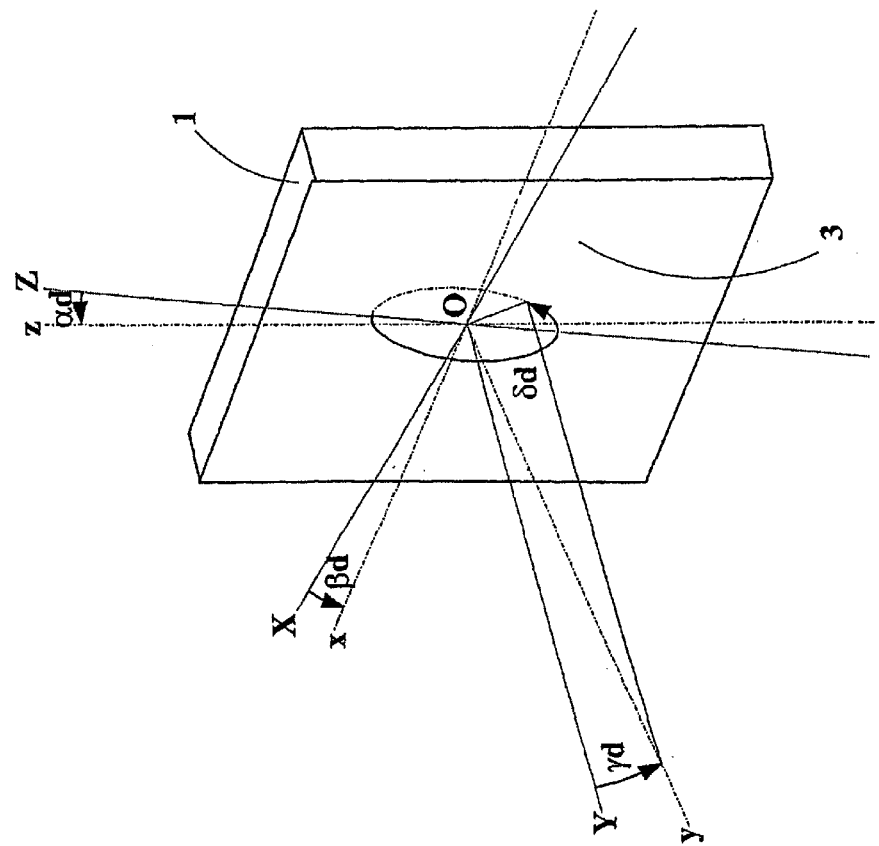
FIGS. 1a and 1b are schematic illustrations of the angles characterizing the process of the invention.
Figure 1A:
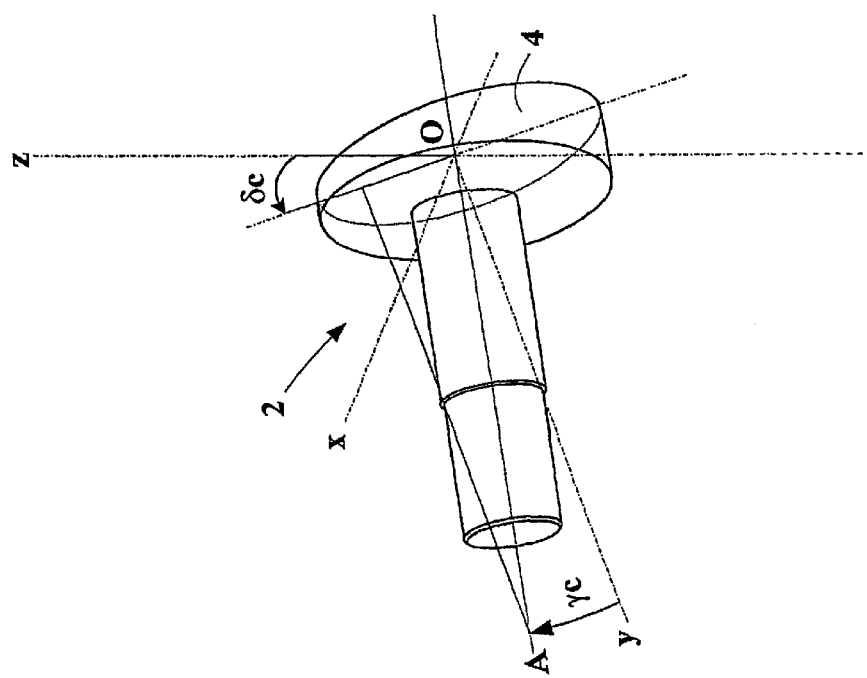

FIGS. 1a and 1b illustrate the principle on which the invention is based. They how a plate 1 that is part of the suspension system (not shown). This plate is designed to receive a stub axle that supports a wheel of the vehicle. The plane of the plate Oxz, which corresponds to the surface 3 that will receive the stub axle, is oriented with an error relative to the axis system OXYZ defined by the nominal angles (of camber and of toe-in) determined for a certain type of vehicle. This orientation error has two components: a camber error αd relative to the nominal camber angle and a toe-in error βd relative to the nominal toe-in angle. The two components αd and βd combine to form the error angle γd whose azimuth in the reference plane OXZ is δd. The correction stub axle 2 comprises a stub axle axis OA and a support axis Oy characteristic of its contact surface 4 on the plate (the axis Oy is common to the contact surface 4 of the stub axle and the surface 3 on the plate that will receive the stub axle). The two axes OA and Oy form a given correction angle γc. The process of the invention consists in positioning and fixing the stub axle 2 on the plate 1 along a correction azimuth δc essentially equal to δd+π, in order to minimize the overall statistical final orientation error of the stub axle fitted. By analogy with the error angles, αc and βc can be defined as the camber and toe-in correction angles, respectively, which vary as a function of γc and δc.

It is apparent that the orientation of the planes or axes can be characterized in two ways; namely, either by the camber angle α (angle of the axis Oz with the axis OZ) and the toe-in angle β (angle of the axis Ox with the axis OX), or by the resultant angle γ (i.e., the angle of the axis Oy with the axis OY) and its azimuth δ in the plane OXZ. These two ways are equivalent and can be derived from one another in a known way using the following trigonometric equations or identities between the angles:

$$(tg\alpha)^2 + (tg\beta)^2 = (tg\gamma)^2, \text{ and}$$

$$tg\delta = \frac{tg\beta}{tg\alpha},$$

where tg is the trigonometric tangent function.

The process of the invention can be applied in different ways for different purposes.

It may be desired to minimize the "individual" error, i.e., the error of each sub-assembly produced. For this, a stub axle is chosen whose correction angle corresponds essentially to the error angle γd found on the plate. This correction stub axle 2 is positioned along the correction azimuth δc that is essentially equal to the angle of the error found δd+π(in radians) or δd+180 (in degrees). Several types of stub axles are needed, each type having a different correction angle (γc1, γc2, γc3, γc4 . . . ) so as to cover more or less finely a fairly large range of corrigible errors. The correction requires the complete determination of the orientation error (αd and βd or γd and δd). This is one of the preferred ways of implementing the invention.

A different approach consists in reducing the (known) scatter of a suspension system production which would not be acceptable without correction; in other words, one which would produce too large a number of sub-assemblies outside the tolerance range corresponding to their camber (α) and toe-in (β) angles. The required statistical reduction of scatter can be achieved by limiting intervention to the positioning of correction stub axles of only one type (γc). This ensures a lower scatter compared with the scatter of the production operation, solely by choosing the positioning azimuth as a function of the azimuth δd of the error found. In this case, it is only necessary to determine the azimuth of the error δd, whether directly or by calculation as a function of the angles measured (see above).

This particular application of the process will be better understood from the description of the graphical representations shown in FIGS. 2a and 2b.

FIG. 2a is a schematic section in the plane OYZ, showing the tolerance range DTF of the final orientation of the stub axle arm relative to the axis system OXYZ. The greater extent of the tolerance ranges (P, T1, T2) of the orientation of the stub axle receiving surface 3 on the suspension system according to the process of the invention is also shown. This view gives a better understanding of the correlation between the graphical representation of FIG. 2b and the geometry described in FIGS. 1a and 1b.

FIG. 2b depicts the angles described above in the form of their tangents and corresponds to a section of FIG. 2a viewed along the direction V (the angles considered being small, i.e. behaving essentially like their tangents). The tangent of the toe-in angle error (tg β) is shown on the abscissa, and the tangent of the camber angle error (tg α) is shown on the ordinate. The shaded rectangle corresponds to the tolerance range envisaged for the orientation of the stub axle, for example ±a for the camber angle (angle α) and ±b for the toe-in angle (angle β). A correction stub axle is used which has a correction angle γc whose tangent is at most equal to half the diagonal of the tolerance rectangle, i.e., $(tg(\gamma c) \leq \sqrt{a^2 b^2}$. For example, suppose that γc is such that tg(γc)=a. An existing error (αd1, βd1) corresponds to an error angle γd1 along an error azimuth δd1. This error is brought within the tolerance range (shaded range) by positioning the correction stub axle arm 2 along a correction azimuth δc1 essentially equal to the error azimuth found δd1 plus α. The circle C of radius a represents the corrections possible by virtue of a correction stub axle with an angle γc such that tg (γc)=a. This allows the determination of a zone of corrigible error represented by the perimeter P located a distance "a" from the tolerance range of the final orientation of the stub axle fitted. This corrigible error zone can in turn be defined as the tolerance zone of the orientation of the plate, i.e., that of the suspension sub-assembly without the stub axle. Likewise, a tolerance rectangle T1, T2 can be defined, which has the advantage that it can be described in the form of tolerances similar to that of the final orientation of the stub axle (±a and ±b) but appreciably greater. It is therefore apparent that the process makes it possible to reduce the scatter of a production operation by virtue of the simple azimuthing of a single correction stub axle. Thus, if the production of assemblies without their stub axles gives results within a known tolerance range, the process of the invention can be used to guarantee the production of assemblies fitted with stub axles that will conform to an interestingly reduced tolerance range.

Considering now the example of a suspension system without its stub axle which conforms perfectly, i.e., one whose toe-in and camber angle errors are zero, it can be seen that correction by the fitting of a correction stub axle serves no purpose but is possible if the correction angle of the stub axle satisfies the criterion given above $(tg(\gamma c) \leq \sqrt{a^2+b^2}$, i.e., $\gamma c \leq arctg\sqrt{a^2+b^2}$, since γc is small). This criterion guarantees that the orientation of the stub axle fitted will conform to the tolerance range despite this correction. Indeed, it is in light of this possibility that the criterion finds its origin. The advantage of a systematic correction is naturally to enable a simple process using a single correction stub axle regardless of the error in the corrigible range. Certain sub-assemblies will be less precise because of the correction, but this does not prevent the scatter from being reduced overall. This constitutes one of the preferred embodiments of the invention.

To give a numerical example derived from FIG. 2b, let us consider the particular case of an axle whose stub axles must be oriented along nominal angles with a precision of ±30' of camber and ±15' of toe-in. We then have a=tg(30') and b=tg(15'). As explained above, a stub axle can be fitted which has a correction angle γc such that tg (γc)=a=tg (30'), hence γc=30'. The perimeter P then extends from −a−b=tg (−45') to +a+b=tg(45') on the abscissa (toe-in) and from −2a=tg (−60') to 2a=tg (60') on the ordinate (camber). It should be remembered that this perimeter corresponds to the tolerance range made possible for the sub-assembly without its stub axle. In this numerical example, an advantageous manufacturing tolerance rectangle T1, T2 can then be deduced (for example, from the diagram). This indicates the interest of the process in terms of reducing the manufacturing costs.

Depending on the technique used to fix the stub axle to the suspension system, it may be desirable to reduce the number of possible positions. In effect, while attachment by welding or by press fitting into a bore allows the stub axle to be fixed along any desired azimuth, some solutions can entail a restriction of the number of possible azimuths. For example, fixing by screws or bolts with the use of several holes chosen appropriately, such as four screws for eight holes spaced 45° apart, allows a satisfactory number of fixing azimuths to be obtained. Such a limitation slightly reduces the perimeter of the corrigible errors but this solution may be preferred because of its simplicity. Referring once more to FIG. 2b, the perimeter P is reduced to the rectangle T1 of height 2×a+√2×a and width 2×b+√2×b. Naturally, if the attachment is made with screws and oblong holes that allow sufficient latitude, the stub axle can again be fitted along any azimuth.

FIG. 3 shows a suspension system 30 of the type known as "multi-arm". It comprises a support 33 which may be either the vehicle body or an element designed to be attached to the body. On each side of the vehicle, arms 31, 31' support a plate 36. According to the method of the invention, a correction stub axle 32 perforated with four holes 35 is fixed to each plate 36 using four screws (not shown). Here, the screws can be fitted in eight threaded holes 34, which is to say that the correction can be given eight different azimuths. Naturally the converse is also possible, namely to fix four screws in four threaded holes 34 with the stub axle having eight holes 35. Similarly, the threaded holes can be on the stub axle and the non-threaded holes on the plate. In general, an attachment can be formed by a number "n1" of screws or bolts, a number "n2" of holes on one of the two components and a number "n3" of threaded holes on the other of the two components, n2 and n3 being greater than or equal to n1. The number of different azimuths is then greater than or equal to the larger of the two numbers n2 and n3.

FIG. 4 shows an axle of the so-termed "torsion" type 40, very commonly used as the rear suspension system in passenger cars. This example makes it possible to illustrate a particular way of implementing the method according to the invention. The stub axle orientation tolerances are sometimes expressed in relative terms, i.e., in terms of the orientation of one stub axle 41 relative to the other 42. This is often the case for the toe-in angle, which is also the angle whose tolerance is generally the closest. In this case it is advantageous (in order to limit the overall cost of the assembly) to fit a "normal" stub axle 41, i.e., one with no correction or azimuthing, on an arm 45 of the axle and then fit, in accordance with the invention, a correction stub axle 42 along an azimuth on the other arm 45' of the axle as a function of the relative error (αd, βd). The axis system OXYZ relative to which the correction is made (see above) is then related to the opposite stub axle 41 fitted first; that is to say, αd, βd are the angles of the orientation errors of the receiving surface 43 relative to the axis of the opposite stub axle 41. In this plan view, only the relative toe-in angle β and the toe-in correction βc provided by the stub axle 42 are shown. The relative toe-in angle β is the sum of the nominal relative toe-in angle βN and the relative toe-in error angle βd.

Figure 5:
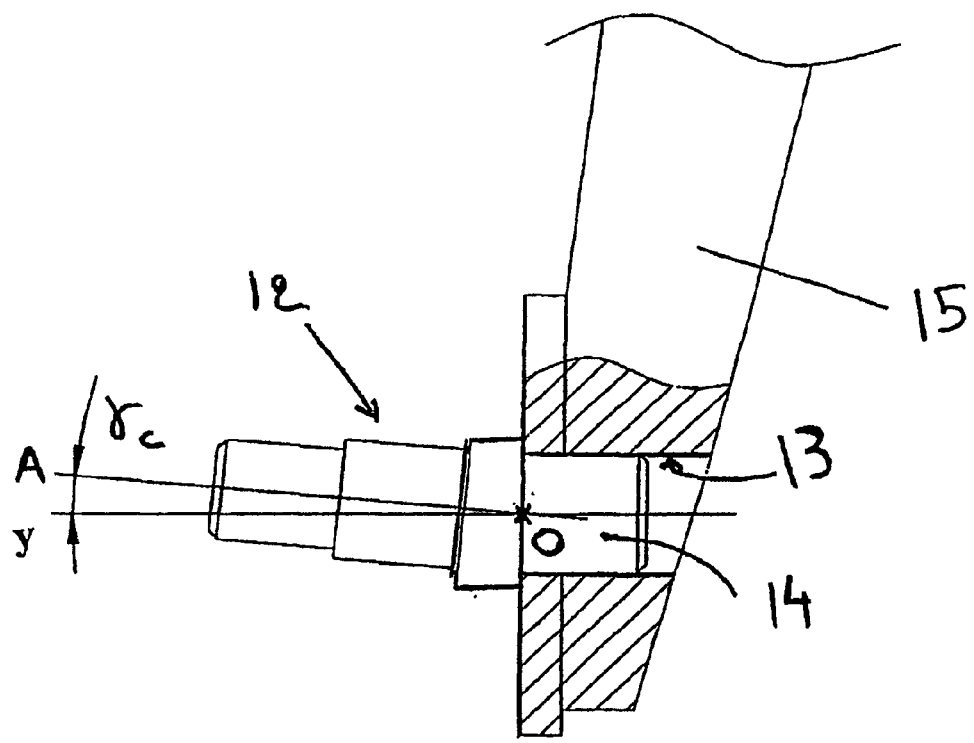
FIG. 5 is a schematic representation of a method for connecting a correction stub axle to a suspension arm.

FIG. 5 shows a partial view of a suspension arm 15 and its attachment to the correction stub axle 12. In this case, the receiving surface of the suspension system is a bore 13 into which is fitted a cylindrical projection 14 which constitutes the support surface of the stub axle 12. The axis Oy of the cylindrical projection 14 forms a correction angle γc with the axis of the stub axle OA as described earlier. Once the stub axle 12 has been aligned along an azimuth, its position can be fixed by welding, by means of screws, or by press fitting in a manner known as such.

By analogy, the same principle, described here in the case of a stub axle fitted on a plate, can be applied to other systems which do not comprise a stub axle but a wheel support (see above) in which bearings are guiding a rotating hub. This is generally the case with the suspension systems of a drive wheel. To apply the principle of the invention one can use, for example, an intermediate element comprising a bored internal surface designed to receive the bearings and a cylindrical revolution surface that enables attachment along a given azimuth in a corresponding receiving bore of the wheel support, such that the axes of these two surfaces form a correction angle. The method according to the invention then consists in fixing the intermediate element on the wheel support along a correction azimuth as a function of the measured orientation error of the axis of the receiving bore of the wheel support.

The method of the invention can be implemented during the assembly of complete suspension sub-assemblies, during the fitting of stub axles to previously assembled sub-assemblies, or also after the suspension elements have been assembled on the vehicle.

Although the invention has been described and illustrated by reference to specific embodiments thereof, it will be understood that such embodiments are susceptible of variaiton and modification without departing from the inventive concepts disclosed. All such variations and modifications, therefore, are intended to be encompassed within the spirit and scope of the appended claims.

What is claimed is:

1. A process for the fitting of a stub axle on a suspension system designed for mounting on a vehicle, said suspension system comprising a stub axle receiving surface, said stub axle having a stub axle axis and a support surface onto said suspension system, such that a characteristic axis of said support surface forms a given correction angle γc with said stub axle axis, said process comprising the following steps:

determining the azimuth δd of an orientation error of a characteristic axis of said receiving surface; and positioning said stub axle on said suspension system along an azimuth δc essentially equal to δd+π.

2. The process according to claim 1, further comprising the step of selecting a stub axle as a function of an angle γd of said orientation error.

3. The process according to claim 1, wherein the suspension system is one of a number of suspension systems, and wherein said correction angle γc is selected to have the same value for all of the number of suspension systems.

4. The process according to claim 1, wherein said orientation error of said characteristic axis of said receiving surface is determined relative to an axis of an opposite stub axle of said suspension system.

5. The process according to claim 1, further comprising fixing said stub axle on said suspension system by means of four screws.

6. The process according to claim 1, further comprising fixing said stub axle on said suspension system with the aid of oblong holes.

* * * * *